United States Patent Office 3,645,941
Patented Feb. 29, 1972

3,645,941
METHOD OF PREPARING 2-p-DIOXANONE POLYMERS
Thomas C. Snapp and Alden E. Blood, Longview, Tex., assignors to Eastman Kodak Company, Rochester, N.Y.
No Drawing. Filed Apr. 1, 1970, Ser. No. 24,877
Int. Cl. C08g *17/02*
U.S. Cl. 260—18                                      10 Claims

ABSTRACT OF THE DISCLOSURE

This invention relates to a method for preparing homopolymer of 2-p-dioxanone having molecular weights within the range of from about 2000 to about 4000 by utilizing an organotin catalyst having one of the general formulae:

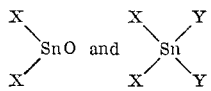

in which the X's represent an alkyl, aryl, aralkyl, or an acyloxy radical and the Y's represent an alkyl, aryl, aralkyl, acyloxy, halogen, or hydroxy radical. These polymers are especially suitable as surface coating materials, e.g. waxes and polishes.

---

This invention relates to new and useful methods for preparing polymeric materials derived from 2-p-dioxanone which are especially useful as surface coatings such as waxes and polishes.

The compound 2-p-dioxanone which has the formula

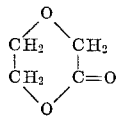

is a cyclic ester or lactone which is old and well known but for which, until relatively recently, uses have long been wanting. The compound may be prepared by numerous methods among which dehydrogenation of diethylene glycol is probably the most well known. Copending application U.S. Ser. No. 45,465 filed June 11, 1970 illustrates one preferred dehydrogenation process for the preparation of 2-p-dioxanone. In the past, one of the serious obstacles to the development of uses for 2-p-dioxanone lies in the property of this compound to undergo polymerization, and often spontaneous polymerization to low molecular weight products which have not been deemed useful for any purpose. Much effort has been expended in attempting to forestall this spontaneous polymerization by such techniques as ring substitution. As a result of these attempts to obtain useful polymers, two distinct homopolymeric products of 2-p-dioxanone have been obtained. One type of homopolymeric products are those homopolymers of 2-p-dioxanne having a mlecular weight on the order of up to 1200 to 1300. However, these products have such low molecular weight that these materials are worthless in applications such as surface coatings, for example, waxes, polishes, mold release agents, etc. The other type of homopolymeric products of 2-p-dioxanone which have recently been reported are those products having extremely high molecular weight on the order of greater than about 4000. Such products have proved to be useful for the manufacture of textile fibers. These high molecular weight homopolymers of 2-p-dioxanone suitable for use as precursors for fibers or stretched and oriented films are characterized by the typical X-ray fiber diagram which they yield in stretched conditions. These high molecular weight products are generally prepared through the use of an organo metallic catalyst wherein the metal component is zinc, mercury, or cadmium. Reference to a description of these high molecular weight products can be found in U.S. Pats. 3,063,967 issued Nov. 13, 1962, and 3,063,968 issued Nov. 13, 1962. Once again, of course, a problem with these high molecular weight materials is that they are unsuited for use as waxes, polishes, and other types of surface coatings which generally require a product having a molecular weight of from about 2000 to about 4000.

From a careful review of the prior art as summarized hereinabove, it is readily apparent that all attempts to obtain useful polymers from dioxanone having a controlled molecular weight within the range of from about 2000 to about 4000 have been fruitless. Moreover, a further characteristic of the prior art broadly related to the polymerization of lactones, especially 7 and 8 member ring lactones wherein the reaction is made to go to successful polymer formation, is that although a variety of selected specific catalytic agents have been utilized with the 7 and 8 member ring lactones, prior art researchers have not obtained successful homopolymers of 2-p-dioxanone utilizing any of these specific catalytic materials. For example, one can contrast the catalyst used by Hostettler et al., in U.S. Pats. 2,890,208 issued June 9, 1959, and 3,284,417 issued Nov. 8, 1966, in connection with the polymerization of 7 and 8 member ring lactones with those used by Hostettler et al. in 3,063,967 issued Nov. 13, 1962, in the polymerization of 2-p-dioxanone.

It is therefore an object of this invention to provide a new and useful process for preparing polymers derived form 2-p-dioxanone.

It is another object of this invention to provide a new and useful process for preparing polymers of 2-p-dioxanone which yield satisfactory surface coating materials such as waxes, polishes, etc.

It is still another object of this invention to provide processes for the preparation of polydioxanone which process is characterized by yielding a polymer having a controlled molecular weight within the range of from about 2000 to about 4000.

Other objects and advantages of the present invention will appear in the description hereinbelow and the appended claims.

According to the present invention it has now been discovered that by the employment of a specific type of organotin compound homopolymers of 2-p-dioxanone are obtainable which polymers are characterized by a molecular weight within the range of from about 2000 to about 4000 and which are capable of being utilized as surface coating materials such as waxes and polishes. The organo-tin compounds herein contemplated as catalysts for the preparation of the instant homopolymers are characterized by the following general formulae:

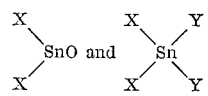

in which the X's are members selected from the group comprising alkyl, aryl, aralkyl and acyloxy radicals and the Y's are members selected from the group comprising alkyl, aryl, aralkyl, acyloxy, halogen and hydroxy radicals. Through the process of the present invention it has been discovered that catalysts having the general formulae described immediately hereinabove may be used to provide a method for the preparation of homopoly-2-p-dioxanone having a controlled molecular weight within the range of from about 2000 to about 4000, usually within the range of from 2500 to 3500. As noted, these homopoymers are suitable for use as surface coating materials such as waxes and polishes.

The tetravalent tin catalyst utilized in the present invention and illustrated by the above-noted general formulae are further characterized in that the alkyl radicals contain from 1 to 8 carbon atoms, the aryl radicals are either phenyl or naphthyl, the aralkyl radical is selected from the benzene series containing from 7 to 9 carbon atoms (e.g. benzyl, phenylethyl, etc.), and the acyloxy radical is derived from an organic acid containing from 2 to 18 carbon atoms. The catalysts useful in the present invention are selected from the group of catalysts disclosed in U.S. Pat. 2,720,507 issued Oct. 11, 1955. General methods of preparation for the catalyst used in the present invention can be found in that patent which is hereby incorporated by reference thereto. Although any of the tetravalent tin catalysts described hereinabove give useful results in the process of the present invention, examples of those organo-tin catalysts which have been found especially useful are dibutyltin oxide, dibutyltin dilaurate, and dibutyltin di-2-ethylhexoate.

The homopolymerization of 2-p-dioxanone by the organo-tin catalyst according to the present invention can be achieved in bulk, suspension or solution systems, non-aqueous solutions are utilized for the polymerization of 2-p-dioxanone when using a solution system. An inert atmosphere although not required, is preferred in this polymerization process. Solvents suitable for the polymerization of 2-p-dioxanone according to the instant invention include the following: tetralin, o- and m-dichlorobenzene, cymene, and nitrobenzene. Other suitable solvents for the 2-p-dioxanone are toluene, xylene, dioxane, diethyl ether, chloroform and the like. Since 2-p-dioxanone is soluble in a great variety of organic liquids, any of these is suitable for the polymerization procedure. Non-solvents for this compound useful as a liquid suspending medium when utilizing a suspension polymerization system include the aliphatic hydrocarbons such as heptanes, the hexanes and the aliphatic petroleum ethers. Where a solvent is used, the concentration of dioxanone may be any selected concentration although it is preferred to employ solutions from about 25% to about 70% concentration. Agitation of the polymerization system although not necessary is helpful in maintaining adequate mixing of the catalyst and lactone. In the same regard, the catalyst and 2-p-dioxanone can, if desired, be pre-mixed before reaction. Whereas for practical purposes excellent results are obtained while operating at atmospheric pressure, it has been found that the polymerization reaction can also be conducted satisfactory at elevated pressure. Reaction temperatures for the instant process can be varied over a range of from about 100 to 200° C. A preferred reaction temperature for the instant invention is from 130 to about 175° C. Temperatures lower than 100° C. may also be used; however, the reaction proceeds quite slowly—hence higher temperatures are preferred. Temperatures in excess of 200° C. may also be used except once again poor results are obtained and moreover color formation and decomposition of the polymer may occur. Length of the reaction time may vary greatly. Generally the reaction time is from about 2 to about 10 hours at the temperatures noted above and usually within about 4 to about 8 hours. However, with higher or lower temperatures and/or varying pressure longer or shorter reaction times may be involved.

The amount of catalyst employed in the course of the present invention should of course be sufficient to effect polymerization within a reasonable length of time. In practice it has been found that as little as 0.01% of the catalyst based on the weight of the 2-p-dioxanone will result in polymer formation within several hours. The amount of catalyst necessary is also related to the purity of 2-p-dioxanone, and consequently with the purest samples of monomer, less catalyst is necessary. The upper limit of catalyst is not critical but it has been found that no useful purpose appears to be served by utilizing a catalyst concentration exceeding 2.0% by weight based on the amount of 2-p-dioxanone, usually an amount of catalyst varying from about 0.05% to about 1.0% by weight based on the amount of 2-p-dioxanone being sufficient.

As noted hereinabove, the polymers produced by the process of the instant invention have a molecular weight within the range of from about 2000 to about 4000 and generally, when utilizing the preferred conditions of the instant invention, within the range of from about 2500 to about 3500. These homopolymers are also characterized in that they have excellent color, i.e. a white polymer, and a melting point of approximately 105° C. Generally these homopolymers exhibit a penetration hardness on the order of from about one to about five usually about two (penetration hardness being determined by ASTM Test No. D1321, Needle Penetration Test for Waxes).

The following examples are given by way of illustration and are not to be construed as limitations of this invention, many variations of which are possible without departing from the spirit and scope thereof.

EXAMPLE I

This example demonstrates the use of a dialkyltin carboxylate as a catalyst for the polymerization of 2-p-dioxanone according to the instant invention. In this example, 153 grams of 2-p-dioxanone is added to 0.76 gram of dibutyltin dilaurate. This mixture is maintained under an inert nitrogen atmosphere and heated to about 175° C. for 8 hours with stirring. The resulting viscous liquid is then cooled and a white polymer is obtained. Blending of this polymer into small granules in an acetone slurry is achieved with a Waring Laboratory Blendor. Filtration and drying afforded a granular 2-p-dioxanone homopolymer in a 95% yield. The melting range for this polymer is determined as 102 to 105° C., and the molecular weight is about 3400.

EXAMPLE II

This example demonstrates the use of a dialkyltin oxide as a catalyst for homopolymerization of 2-p-dioxanone according to the instant invention. In this example, the tin catalyst concentration is lower than that noted in Example I above, i.e. in Example I the 0.76 gram of catalyst corresponds to 0.5 weight percent of the catalyst based on the weight of the 2-p-dioxanone utilized. In this example, 510 grams of 2-p-dioxanone is added to 0.4 gram of a dibutyltin oxide catalyst (which corresponds to 0.08 weight percent of the 2-p-dioxanone utilized). This mixture is heated at 150° C. for 5 hours with stirring in a nitrogen atmosphere. The resulting homopolymer of 2-p-dioxanone is granulated in an acetone slurry. The dried product melts at 101°–103° C. and has a molecular weight of 3200. A polymer yield of 93% is obtained in this example.

EXAMPLE III

In this example there is demonstrated the use of a dialkyltin carboxylate catalyst in the polymerization of 2-p-dioxanone at a lower reaction temperature than utilized in Examples I and II hereinabove. In this example, 510 grams of 2-p-dioxanone is added to 1.0 gram of dibutyltin di-2-ethyl hexoate (corresponding to 0.2 weight percent of 2-p-dioxanone). This mixture is heated under a nitrogen atmosphere at 140° C. for 6 hours with stirring. Repeating the granulation procedure utilized in Example I above, a lactone homopolymer in granular form is isolated at a yield of 96%. This white homopolymer of 2-p-dioxanone melts at 103 to about 105° C. and has a molecular weight of 2950.

Similar results to these shown in Examples I through III above can be obtained using different ratios of catalyst to monomeric 2-p-dioxanone as described in the specification hereinbefore. Of course, other catalyst compounds corresponding to the general formulae noted in the specification hereinbefore also can be used and will give similar results.

The invention has been described in detail with particular reference to preferred embodiments thereof, but it will

We claim:

1. A process for the preparation of homopoly-2-p-dioxanone having a molecular weight of from about 2000 to about 4000 which comprises polymerizng, at a temperature of from about 100° C. to about 200° C., 2-p-dioxanone in the presence of a catalytic amount of a polymerization catalyst selected from the group consisting of compounds having one of the general formulae:

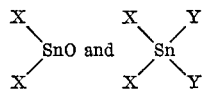

in which the X's are members selected from the group consisting of alkyl, aryl, aralkyl and acyloxy radicals and the Y's are members selected from the group consisting of alkyl, aryl, aralkyl, acyloxy, halogen and hydroxy radicals.

2. A process according to claim 1 wherein said polymerization is carried out in an inert atmosphere.

3. A process according to claim 1 wherein the alkyl radicals have from 1 to 8 carbon atoms, the aryl radical is either phenyl or naphthyl, the aralkyl radical is selected from the benzene series containing from 7 to 9 carbon atoms, and the acyloxy radical is derived from an organic acid containing from 2 to 18 carbon atoms.

4. A process according to claim 1 wherein said polymerization is carried out in a solution system.

5. A process according to claim 1 wherein said polymerization is carried out in a suspension system.

6. A process according to claim 1 wherein said polymerization catalyst is present in the amounts of between about 0.01 to about 2.0 percent by weight based on the weight of the 2-p-dioxanone.

7. A process according to claim 6 wherein the amount of catalyst is between about 0.05 percent and 1.0 percent by weight of the 2-p-dioxanone.

8. A process according to claim 6 wherein said catalyst is selected from the group consisting of dialkyltin oxides and dialkyltin carboxylates.

9. A process according to claim 8 wherein said catalysts are selected from the group consisting of dibutyltin oxide, dibutyltin dilaurate, and dibutyltin di-2-ethyl hexoate.

10. A process according to claim 1 wherein the molecular weight of the homopoly-2-p-dioxane is between about 2500 and about 3500.

References Cited
UNITED STATES PATENTS 2,890,208  6/1959  Young et al. _____ 260—78.3
3,063,968  11/1962 Schultz _____ 260—78.3
3,190,858  6/1965  Cox et al. _____ 260—78.3

DONALD E. CZAJA, Primary Examiner

E. C. RZUCIDLO, Assistant Examiner

U.S. Cl. X.R.
260—33.2 R, 33.6 R, 33.8 R, 78.3 R